(12) United States Patent
Boulby

(10) Patent No.: US 12,243,042 B2
(45) Date of Patent: Mar. 4, 2025

(54) WEARABLE DEVICE, SYSTEM AND METHOD

(71) Applicant: KIROCO LIMITED, Wetherby (GB)

(72) Inventor: Simon Andrew Boulby, Wetherby (GB)

(73) Assignee: KIROCO LIMITED, Wetherby (GB)

( * ) Notice: Subject to any disclaimer, the term of this patent is extended or adjusted under 35 U.S.C. 154(b) by 0 days.

(21) Appl. No.: 16/484,710

(22) PCT Filed: Feb. 13, 2018

(86) PCT No.: PCT/GB2018/050393
§ 371 (c)(1),
(2) Date: Aug. 8, 2019

(87) PCT Pub. No.: WO2018/150174
PCT Pub. Date: Aug. 23, 2018

(65) Prior Publication Data
US 2020/0042977 A1    Feb. 6, 2020

(30) Foreign Application Priority Data

Feb. 14, 2017    (GB) ...................................... 1702361

(51) Int. Cl.
| | |
|---|---|
| G06Q 20/32 | (2012.01) |
| G06F 1/16 | (2006.01) |
| G06K 7/10 | (2006.01) |
| G06Q 20/10 | (2012.01) |

(52) U.S. Cl.
CPC ......... *G06Q 20/3278* (2013.01); *G06F 1/163* (2013.01); *G06K 7/10366* (2013.01); *G06Q 20/108* (2013.01)

(58) Field of Classification Search
CPC .................................................. G06Q 20/3078
See application file for complete search history.

(56) References Cited

U.S. PATENT DOCUMENTS

| | | | |
|---|---|---|---|
| 5,649,381 A * | 7/1997 | Studer ...................... | A44C 5/00 |
| 9,697,459 B2 * | 7/2017 | Finn ......................... | H01Q 7/00 |
| 10,008,762 B2 * | 6/2018 | Andujar Linares ...... | H01Q 9/42 |
| 2003/0117900 A1 | 6/2003 | Fujisawa et al. | |

(Continued)

FOREIGN PATENT DOCUMENTS

| | | | | |
|---|---|---|---|---|
| CA | 3057941 | * | 10/2018 | ............... H01Q 1/22 |
| CN | 102449560 | * | 5/2012 | |

(Continued)

OTHER PUBLICATIONS

Palaghias, et al., in "Accurate Detection of Real-World Social Interactions with Smartphones," from IEEE, 2015 (Year: 2015).*

*Primary Examiner* — Mike Anderson
*Assistant Examiner* — Brandon M Duck
(74) *Attorney, Agent, or Firm* — E. Eric Mills; Nicholas P. Stadnyk; Maynard Nexsen PC

(57) ABSTRACT

A wearable device, system and method. The wearable device comprises a frame portion and a body portion. The frame portion is formed from a metallic material and the body portion is formed from a non-metallic material. The frame portion is configured to partially surround the body portion. The body portion supports at least one passive or active tag thereon such that the tag is operable through an opening in the frame portion.

15 Claims, 12 Drawing Sheets

(56) References Cited

U.S. PATENT DOCUMENTS

| | | | |
|---|---|---|---|
| 2015/0049262 A1* | 2/2015 | Liao | G06F 1/16 |
| 2015/0153712 A1* | 6/2015 | Peters | |
| 2015/0310412 A1* | 10/2015 | Calderon | G06K 7/01 |
| | | | 235/380 |
| 2016/0051191 A1* | 2/2016 | Miller | A61B 5/681 |
| | | | 600/300 |
| 2016/0142866 A1 | 5/2016 | Jang et al. | |
| 2016/0218419 A1* | 7/2016 | Vance | H01Q 1/273 |
| 2017/0077589 A1* | 3/2017 | Fine | H01Q 1/22 |
| 2017/0117093 A1* | 4/2017 | Kim | H01F 38/14 |
| 2017/0248922 A1* | 8/2017 | Hynecek | G04B 37/005 |
| 2018/0048341 A1* | 2/2018 | Shin | G04G 17/06 |
| 2018/0275715 A1* | 9/2018 | Park | |

FOREIGN PATENT DOCUMENTS

| | | | | |
|---|---|---|---|---|
| CN | 204440027 | * | 1/2015 | H01Q 1/22 |
| CN | 205376763 U | | 7/2016 | |
| CN | 106299678 | * | 8/2016 | |
| CN | 106410400 A | | 2/2017 | |
| DE | 102015115574 A1 | | 5/2016 | |
| GB | 2460890 A | | 12/2009 | |
| KR | 20060025838 A | | 3/2006 | |
| KR | 100791973 B1 | | 1/2008 | |
| WO | WO 2017062621 | * | 10/2016 | |

\* cited by examiner

WEARABLE DEVICE, SYSTEM AND METHOD

CROSS REFERENCE TO RELATED APPLICATIONS

This application is a 35 U.S.C. § 371 U.S. national phase entry of International Application No. PCT/GB2018/050393 having an international filing date of Feb. 13, 2018, which claims the benefit of Great Britain Application No. 1702361.5 filed Feb. 14, 2017, each of which is incorporated herein by reference in its entirety.

This invention relates to a wearable device, system and method. The wearable device includes metallic materials and comprises at least one passive or active tag or chip for holding data thereon.

BACKGROUND

Wearable technology relates to wearable electronic devices worn on the body or close to the body. Wearable devices incorporate some form of electronics such as radio-frequency tags and microcontrollers.

Radio-frequency identification (RFID) uses radio-frequency electromagnetic fields to transfer or receive data from a tag or chip attached to an object, principally for the purposes of automatic identification (e.g. allowing a person access to a building) and tracking and monitoring products (such as stocktaking or assembly line monitoring). Some tags or chips are passive and do not require a battery. Passive tags or chips are powered by the electromagnetic fields used to read them. Non passive (active) tags or chips use a local power source, for example a battery, and emit radio waves (electromagnetic radiation at radio frequencies). The tag or chip contains electronically stored information which can be read by a reader from up to several meters away. Near field communication (NFC) is a set of standards covering communications protocols based on existing RFID. NFC requires touch or bringing a reader and tag into close proximity to each other in order to establish radio communication with each other.

Existing wearable technological devices are made from a variety of materials, however, it can be challenging to produce wearable devices from metallic materials. Often producing wearable devices incorporating electronics using metal is challenging because metals often interfere with the electronic components or radio frequency and cause a Faraday cage effect around the electronic components thereby blocking and excluding propagation of electromagnetic influences. One aim of the present invention is to mitigate some of the problems encountered with metallic materials in wearable devices.

WO 2014/016609 A1 discloses a piece of jewellery, wherein the jewellery comprises at least one tag or chip programmed with at least a unique identification code, and a tag reader is configured to read the tag or chip when the tag reader and the piece of jewellery touch, or come into close contact and, display a message or content associated with the unique identification code.

BRIEF SUMMARY OF THE DISCLOSURE

According to a first aspect of the present invention, there is provided a wearable device comprising:
a frame portion; and
a body portion;
wherein the frame portion is formed from a metallic material and the body portion is formed from a non-metallic material, the frame portion being configured to partially surround the body portion, the body portion supporting at least one passive or active tag thereon such that the tag is operable through an opening in the frame portion.

The wearable device may be for use in banking or payment technology and the at least one passive or active tag may aptly be a banking or payment tag.

According to a first example, there is provided a wearable device for use in banking or payment technology the wearable device comprising:
a frame portion; and
a body portion;
wherein the frame portion is formed from a metallic material and the body portion is formed from a non-metallic material, the frame portion being configured to partially surround the body portion, the body portion supporting at least one banking or payment tag thereon such that the banking or payment tag is operable through an opening in the frame portion.

The frame portion may optionally include one or more locating groove configured to couple with the body portion to support the body portion in the frame portion. The locating groove may be sized and shaped to receive the body portion to support the body portion within the frame.

The one or more locating groove may comprise a recess in an inner surface of the frame portion into which the body portion is configured to sit. In this way the frame portion can help to securely hold the body portion in place.

The frame portion may comprise a plurality of frame elements. The plurality of frame elements may be configured with an opening between at least two of the frame elements. This allows the passive or active tag (e.g. banking or payment tag) to operate through the opening in the frame portion.

The wearable device may optionally further comprise coupling elements for coupling together the plurality of frame elements. The coupling elements may help to provide a more secure connection between elements of the frame portion and may also function to provide a more secure connection between the frame portion and the body portion.

The coupling elements may comprise screws, pins, rods, hinges, rivets and/or adhesives. Releasable coupling elements, such as screws, pins, rods, hinges and rivets, may provide the advantage that the wearable device may be disassembled, thereby allowing the passive or active tag (e.g. banking or payment tag or other RFID or NFC tag), within the device to be replaced.

Each of the frame elements may comprise apertures configured to receive at least a portion of the coupling elements. Thus, the coupling elements (e.g. screws, pins, rods, rivets or adhesives), may fit into the apertures in the respective frame elements to thereby help connect the frame elements together.

The frame portion may comprise first and second spaced apart side frame elements. The gap may be present between each of the first and second side frame elements to allow the passive or active tag (e.g. banking or payment tag) to operate through the gap. The body portion may aptly be provided between the first and second side frame elements.

The body portion may comprise two or more parts and the at least one passive or active tag (e.g. banking or payment tag) may be sandwiched between the two or more parts of the body portion. This may allow for a relatively simple manufacturing process, and can securely hold the tag in place between the parts of the body portion.

The body portion may comprise an orifice, and the at least one passive or active tag (e.g. banking or payment tag) may be supported within the orifice. Thus, the orifice may securely support the tag in the assembled device.

The wearable device may include at least two passive or active tags (e.g. at least two banking or payment tags), wherein each of the at least two tags are programmed with the same or different information. Thus, the device may have multiple functions, or may provide improved connectivity with a tag reader by increasing the likelihood of the tag reader connecting with at least one of the tags.

The at least one passive or active tag (e.g. banking or payment tag) may be programmed to perform multiple functions. This may help to provide the wearable device with more diverse functionality, which may be beneficial to the user.

According to a second aspect of the present invention, there is provided a system comprising a wearable device according to the first aspect, further comprising:
 a tag reader configured to read data from the at least one passive or active tag when the tag reader and the wearable device come into close proximity with each other, to thereby provide an additional authentication step.

The tag reader may aptly be a banking or payment tag reader and the passive or active tag may be a banking or payment tag, and the additional authentication step may be for a banking or payment transaction.

According to a second example, there is provided a system comprising a wearable device according to the first example, further comprising:
 a banking or payment tag reader configured to read data from the at least one banking or payment tag when the banking or payment tag reader and the wearable device come into close proximity with each other, to thereby provide an additional authentication step for a banking or payment transaction.

According to a third aspect of the present invention, there is provided a method for providing additional authentication, the method including:
 i) providing a wearable device according to the first aspect;
 ii) reading data from the passive or active tag with a tag reader; and
 iii) using the data to provide an additional authentication step.

The tag reader may aptly be a banking or payment tag reader and the passive or active tag may be a banking or payment tag, and the additional authentication step may be for a banking or payment transaction.

According to a third example, there is provided a method for providing additional authentication in banking or payment transactions, the method including:
 i) providing a wearable device according to the first example;
 ii) reading data from the banking or payment tag with a banking or payment tag reader; and
 iii) using the data to provide an additional authentication step for a banking or payment transaction.

Aspects of the present invention and examples provide the advantage that a passive or active tag (e.g. banking or payment tag) may be incorporated into a metallic casing, without compromising the operation of the tag.

Some aspects of the present invention and examples provide the advantage that the device may be adaptable to suit different types of wearable device.

Some aspects of the present invention and examples provide the advantage that the device may be disassembled to allow a tag to be removed and replaced.

Some aspects of the present invention and examples provide the advantage that the device may be easier to manufacture compared to known devices.

BRIEF DESCRIPTION OF THE DRAWINGS

Embodiments of the invention are further described hereinafter with reference to the accompanying drawings, in which.

In the drawings like reference numerals refer to like parts.

DETAILED DESCRIPTION

A wearable device is a device that can be worn on or close to the body. In this respect the wearable device can be designed in a convenient form such as an item of jewellery or as a component for a watch strap, or other strap (e.g. wrist strap, fitness tracker strap, etc.). The wearable device can be designed as a standalone item or an item that couples to an existing wearable. The wearable device can be adapted to suit a variety of designs, including a ring, bracelet, pendant, cufflink, earring, brooch, necklace, an integral part of a watch strap, watch strap loop, or a keyring are also envisaged.

The wearable device incorporates at least one passive or active tag. The passive or active tag may be a passive or active RFID, or NFC tag, for example, and may store data, for example authentication data. The authentication data stored may correspond to intended the intended use. For example, the passive or active tag may be configured for security purposes (e.g. access locks for doors, or safes), or user authentication (e.g. for smartphones or PCs), or for any other information sharing (e.g. digital business cards, Wi-Fi information, contact details, digital loyalty cards).

In one example, the passive or active tag may be a banking or payment tag for use in banking or payment technology. As used herein, "banking or payment tag" refers to any suitable RFID tag (including NFC tags or other suitable frequency tag) adapted for banking or payment technology. Banking or payment technology may include any form or banking or payment including "real" currencies and cryptocurrencies, for example bitcoin or blockchain based solutions. As such, the banking or payment tag may be adapted for any banking or payment technology including "real" currencies and cryptocurrencies. The banking or payment tag may provide security or an additional aspect of security (e.g. additional authentication) when accessing secure information, or making banking or payment transactions. The banking or payment tag may also provide other functions of a typical NFC tag.

Figure 1:
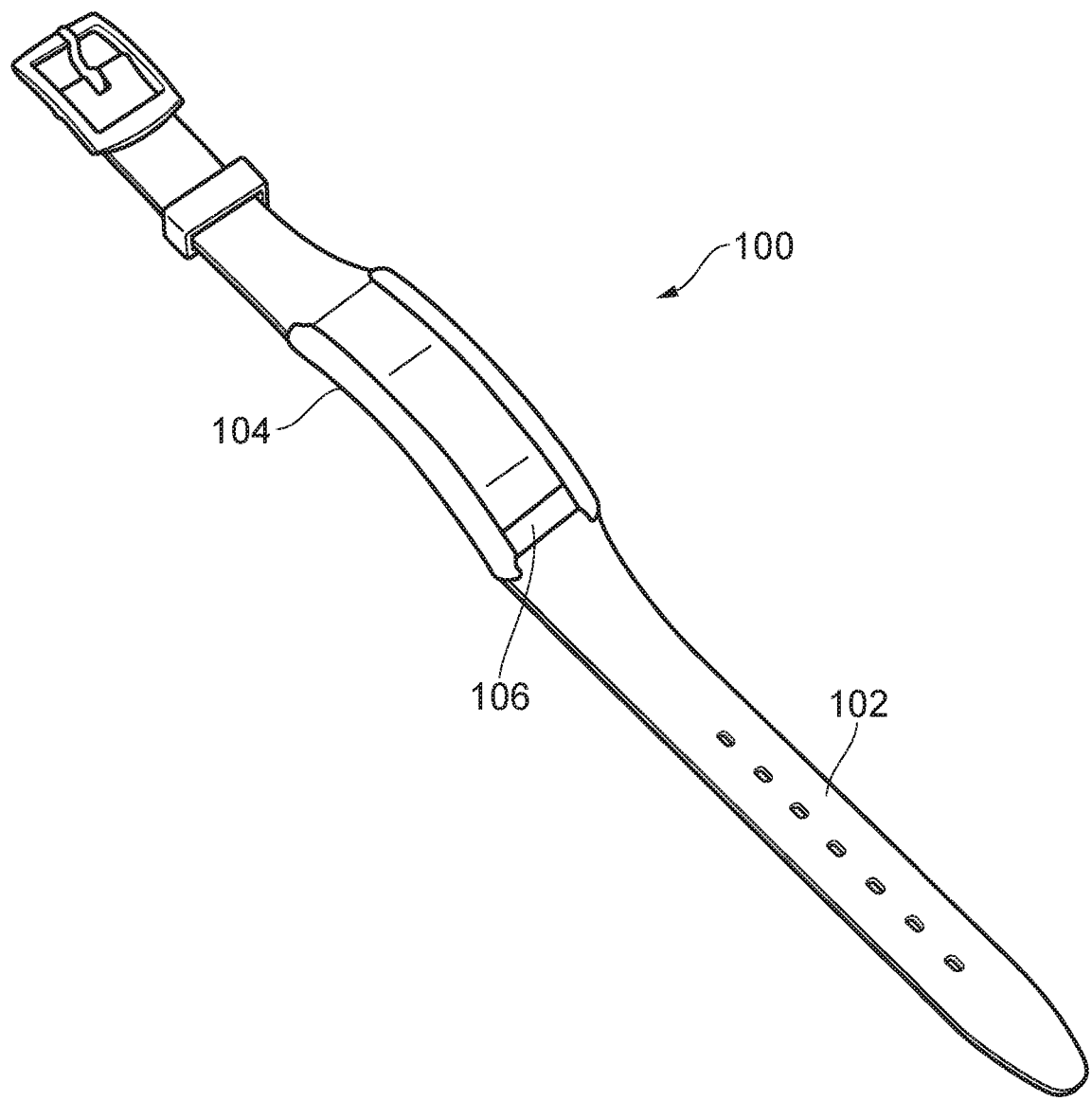
FIG. 1 illustrates a wearable device integrated within an adjustable watch strap.

FIG. 1 illustrates a wearable device 100, which is integrated within an adjustable wrist strap 102.

The wearable device 100 includes a frame portion 104. The frame portion 104 is formed from a metallic material to provide strength and durability to the wearable device 100. The metallic material may also enable the device to have aesthetic properties similar to traditional jewellery. Suitable metallic materials may include precious metals including gold or silver or platinum, or other metals including steel, titanium, carbide, brass, copper, tin, aluminium, for example.

The wearable device 100 further includes a body portion 106. The body portion 106 is formed from a non-metallic material. For example, one or more components of the body portion may be formed from materials including resins, ceramics, polymeric materials, glass, rubber, silicone, wood, plastics, and/or carbon fibre.

Figure 2A:
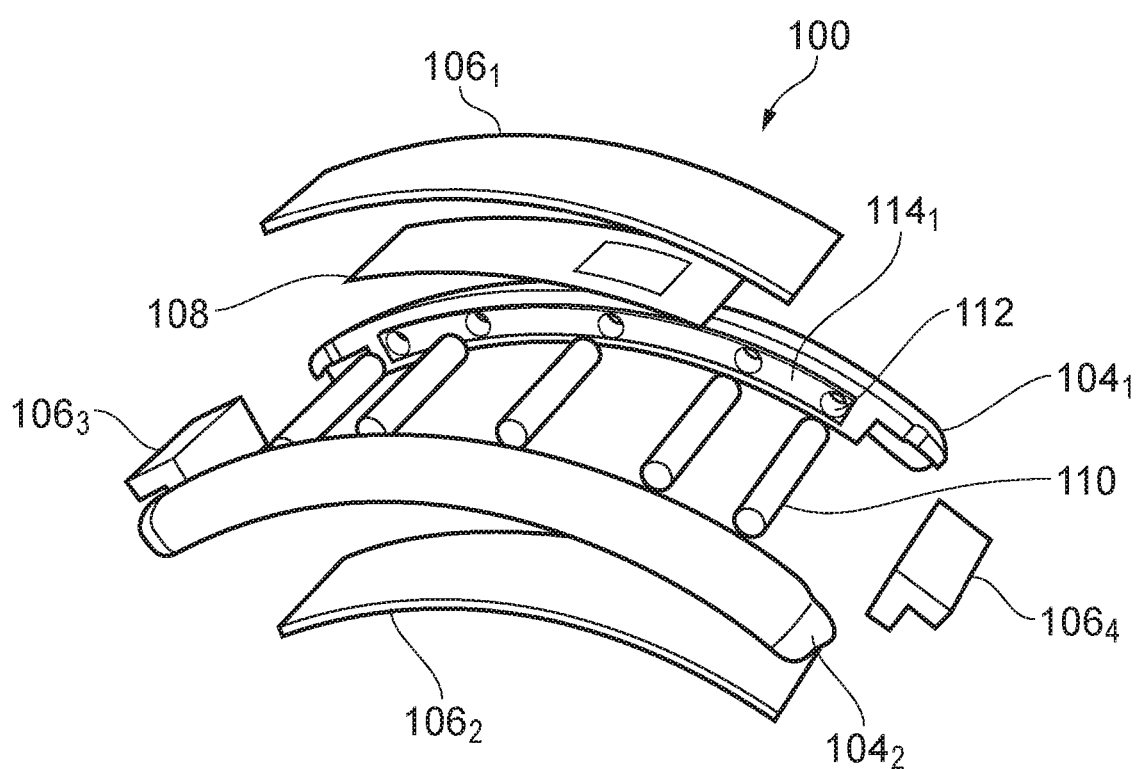
FIGS. 2a and 2b illustrate expanded and side views respectively of a wearable device.
Figure 2B:
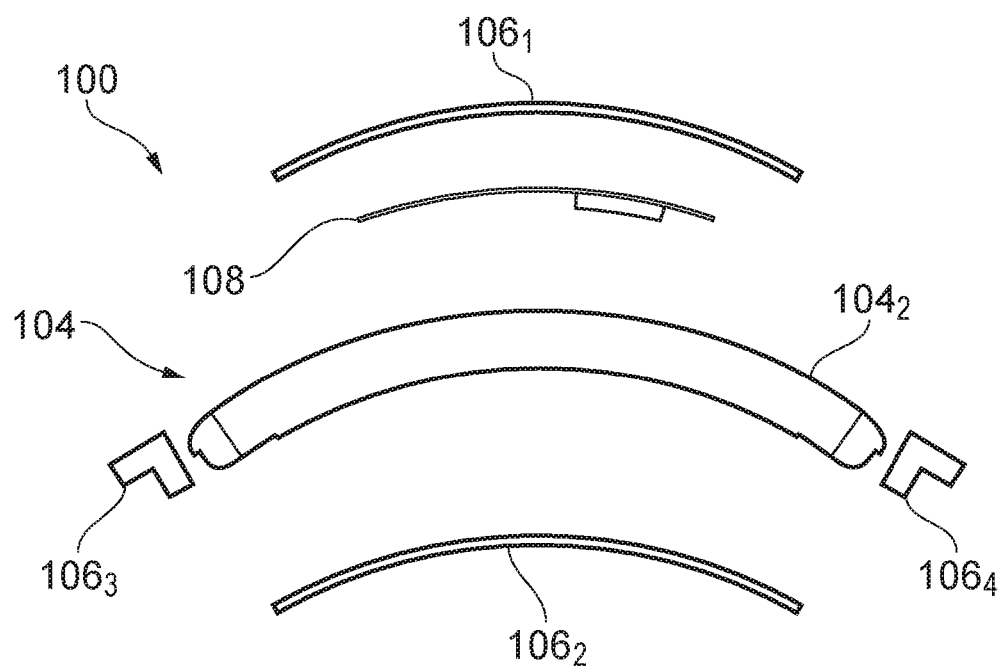

FIGS. 2a and 2b illustrate an example of the wearable device 100.

The frame portion 104 may be a single frame member or constructed from a plurality of separate frame elements. In this example the frame portion 104 is constructed from first and second side frame elements $104_{1-2}$.

The wearable device 100 may further include coupling elements. The coupling elements can be configured in a number of ways. For example, the coupling elements may function to couple together individual frame elements (e.g. side frame elements $104_{1-2}$). In this context the term 'couple' includes direct coupling or indirect coupling via a separate component.

The coupling elements may be formed from conductive or non-conductive materials. For example, the coupling elements may be screws, pins, rods, hinges, rivets or adhesives, for example. In this example the coupling elements are rods 110, which hold together side frame elements $104_{1-2}$. The ends of rods 110 fit into corresponding apertures 112 in an inner surface of each of the side frame elements $104_{1-2}$. The rods 110 may have an interference fit into corresponding apertures 112, such that the side frame elements $104_{1-2}$ are connected via the rods 110. The interference fit provides a relatively strong coupling between the ends of the rods 110 and the first and second side frame elements $104_{1-2}$.

The body portion 106 may be a single body member or constructed from a plurality of separate body elements. In this example the body portion 106 includes upper and lower body elements $106_{1-2}$ and first and second side body elements $106_{3-4}$. The side body elements $106_{3-4}$ function to complete the body to fully encompass the tag, thereby preventing portions of the tag from being exposed. In this example, the wearable device 100 further includes at least one banking or payment tag 108, which is a passive tag. In this example, the wearable device 100 includes one banking or payment tag 108. The banking or payment tag 108 is supported on the body portion 106 of the device.

In this example the banking or payment tag 108 is sandwiched between the upper and lower body elements $106_{1-2}$. The banking or payment tag 108 may be additionally secured in place on the body portion 106 via an adhesive, for example.

The frame portion 104 may include one or more locating groove 114. In this example, there are two locating grooves $114_{1-2}$ located on an inside surface of each side frame element $104_{1-2}$ (where $114_2$ is hidden from view in FIGS. 2a and 2b). The locating grooves function to support the body portion 106, and is aptly sized and shaped to accommodate the body portion 106. In this example, the apertures 112 in an inner surface of each of the side frame elements $104_{1-2}$ are situated within the corresponding locating groove $114_{1-2}$. The body portion 106, may slot into the locating groove 114 in an interference fit, whilst the coupling elements (in this example, rods 110) fit into opposing apertures 112 to connect the side frame elements $104_{1-2}$ together.

The frame portion 104 is configured to frame the body portion 106, i.e. to hold the body securely in the frame. In this example the frame portion 104 is connected to the rods 110. Then the body portion 106, with the tag, is formed around the rods 110. In this example, adhesives are used to attach the body portion 106 to the rods 110 to secure the body portion 106 in place. Thus, in the assembled device, the rods 110 may help to support the body portion 106, with the frame portion 104 encompassing the body portion 106, the tag and the rods.

Figure 3:
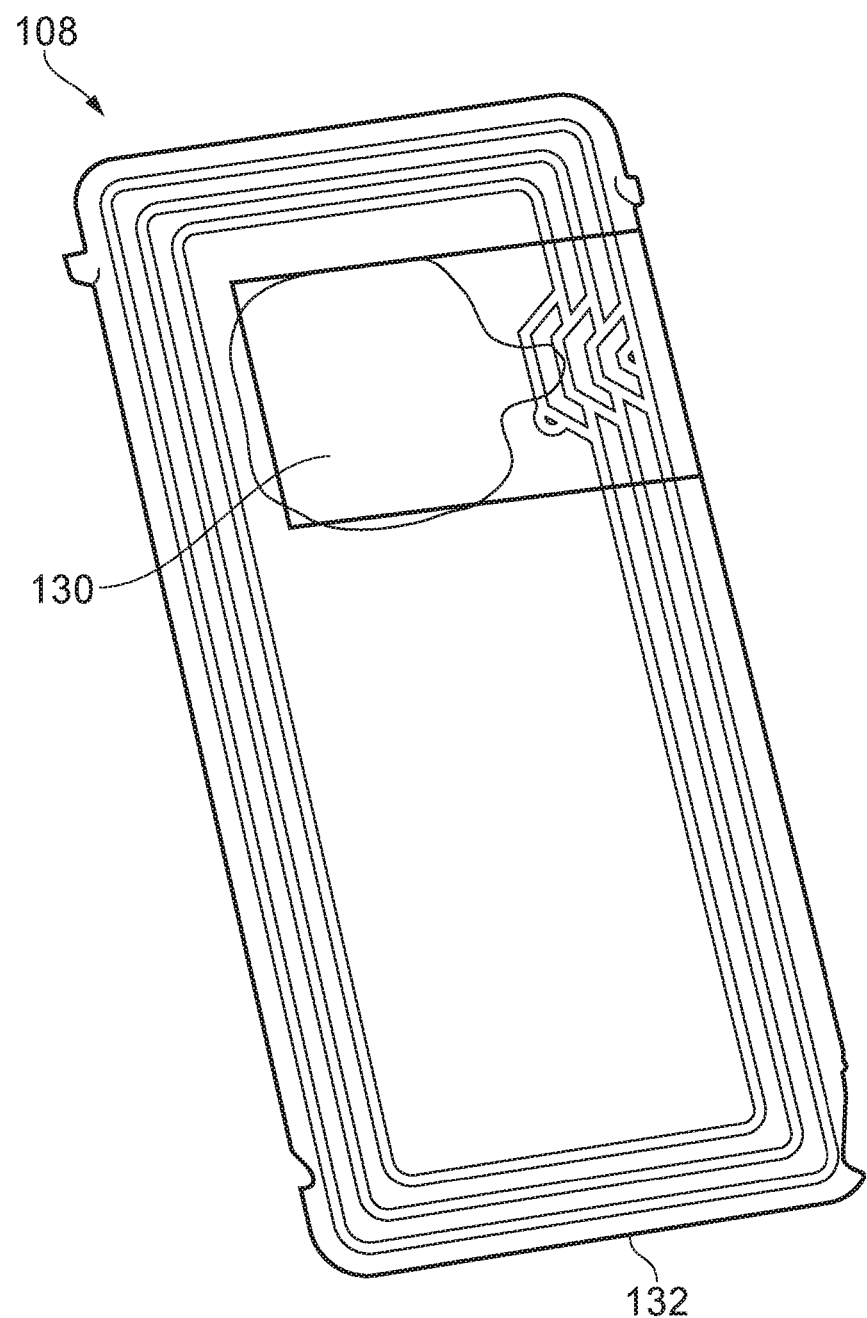
FIG. 3 illustrates an example of a banking or payment tag.

FIG. 3 illustrates an example of a banking or payment tag 108. The tag includes a chip 130, which provides the memory for the banking or payment tag, and an aerial 132. The banking or payment tag 108 can be any suitable RFID tag, for example an NFC tag, or other modified RFID or NFC tag. The banking or payment tag 108 may be configured to perform transaction payments, an additional authentication step for a transaction, or similar security tasks to enable sensitive information to be transferred. The banking or payment tag 108 may also be configured to perform other tasks, including tasks often performed by RFID or NFC tags, such as linking to a website, passing on contact information, enabling access through a door, launching an application on a smartphone or tablet device, or showing or transferring text or a message, or other functions as recognised by those skilled in the art.

The frame portion 104 is designed to partially surround the body portion 106. That is, the frame portion 104 includes a gap so that it does not fully surround the body portion 106. This is helps prevent the frame portion 104 from forming a Faraday cage effect around the banking or payment tag. The gap (or opening) in the frame portion helps to allow the banking or payment tag to operate.

In this example the gap is provided between the spaced apart side frame members $104_{1-2}$. In this example the gap is about 12 mm, though other suitable gap sizes can be used. For example, the gap may be from about 0.1 mm to 30 mm, or from about 1 to 5 mm.

The body portion 106 supports a banking or payment tag 108 thereon such that the banking or payment tag 108 is operable through the gap or opening in the frame portion 104.

The coupling elements 110 can either be made from any suitable materials including conductive or non-conductive materials, non-metallic materials, or made from composite materials. Metallic material may also be suitable so long as the coupling elements 110 do not block the gap in the frame portion 104. The gap is aptly entirely free from metallic materials so as to prevent blocking electromagnetic radiation that would prevent the banking or payment tag 108 from operating. If the coupling elements 110 are formed from non-metallic or electrically insulating materials then they may block the gap in the frame portion 104.

The security data stored on the banking or payment tag 108 may be read by a tag reader (not shown). Any suitable tag reader may be used. For example the tag reader may be a smartphone, tablet device, computer, banking terminal, payment terminal, electronic door lock, or any other device adapted to be capable of reading the operating frequency of the tag.

Once the wearable device 100 is brought within a range suitable for communication with the tag reader (as determined by the operating frequency of the tag), the electromagnetic field produced by the tag reader powers the banking or payment tag 108 such that the tag reader can read the data on the chip. For example, for an NFC tag, the tag may be brought within 4 cm of the tag reader for the electromagnetic field produced by the tag reader to power the tag. It will be appreciated that other tags having different frequency ranges may be brought closer or further away from the tag reader for the tag reader to power the tag.

Figure 4A:
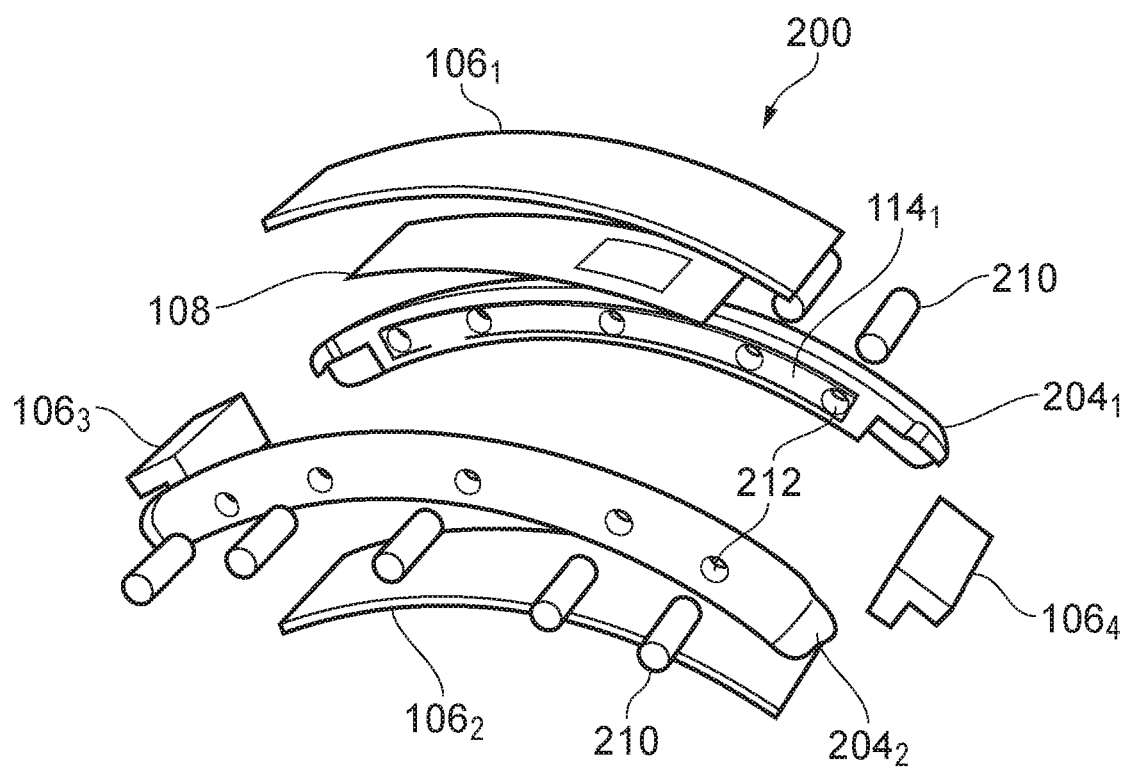
FIGS. 4a and 4b illustrate expanded and side views respectively of another wearable device.
Figure 4B:
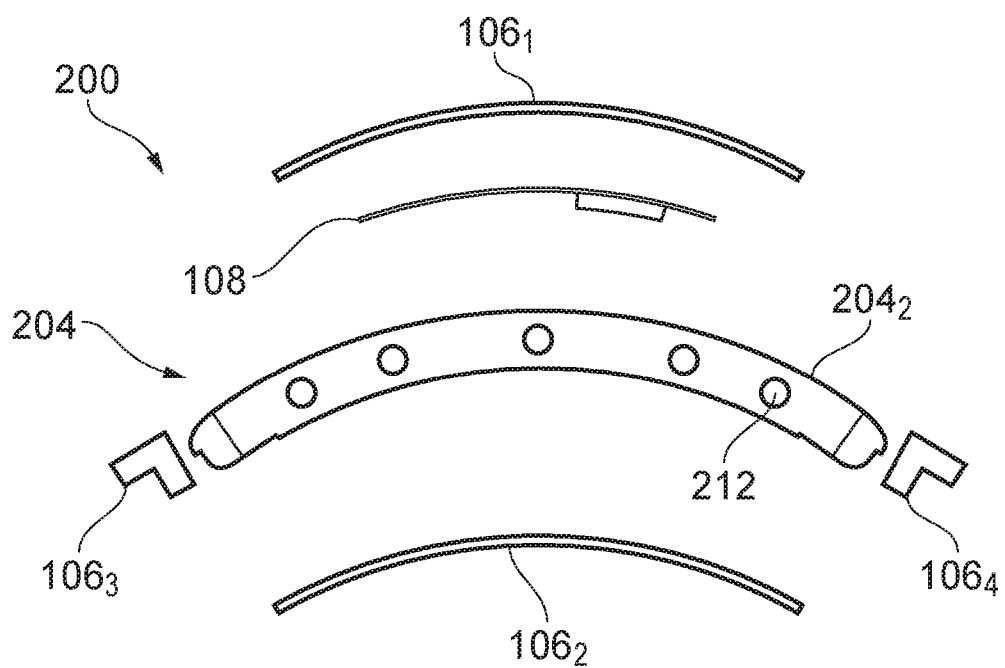

FIGS. 4a and 4b illustrate another wearable device 200. This example has corresponding features to the example of FIGS. 2a and 2b. In this example apertures 212 are provided through the full thickness of each side frame element $104_{1-2}$. In this example, each coupling element comprises two separate sub-coupling elements 210. Each sub-coupling element 210 is fed from an outer surface of a respective side frame element $204_{1-2}$ through a corresponding aperture, until at least a part of the sub-coupling element is exposed through the aperture on the inside surface of the respective side frame element $204_{1-2}$ but a portion of the sub-coupling element is retained within the corresponding aperture.

Each sub-coupling element 210 is then coupled with a corresponding sub-coupling element from the opposing side frame element $204_{1-2}$. The sub-coupling elements are attached to form a complete coupling element, coupling together side frame elements $204_{1-2}$. In this example, one sub-coupling element is formed as a screw (or bolt) that screws into a thread of a corresponding sub-coupling element to couple the sub-coupling elements together. In other examples, the sub-coupling elements may be coupled together through the use of adhesives, a click-fit (e.g. one sub-coupling element may have a female portion to receive a male portion of a corresponding sub-coupling element), or other suitable coupling method.

Figure 5A:
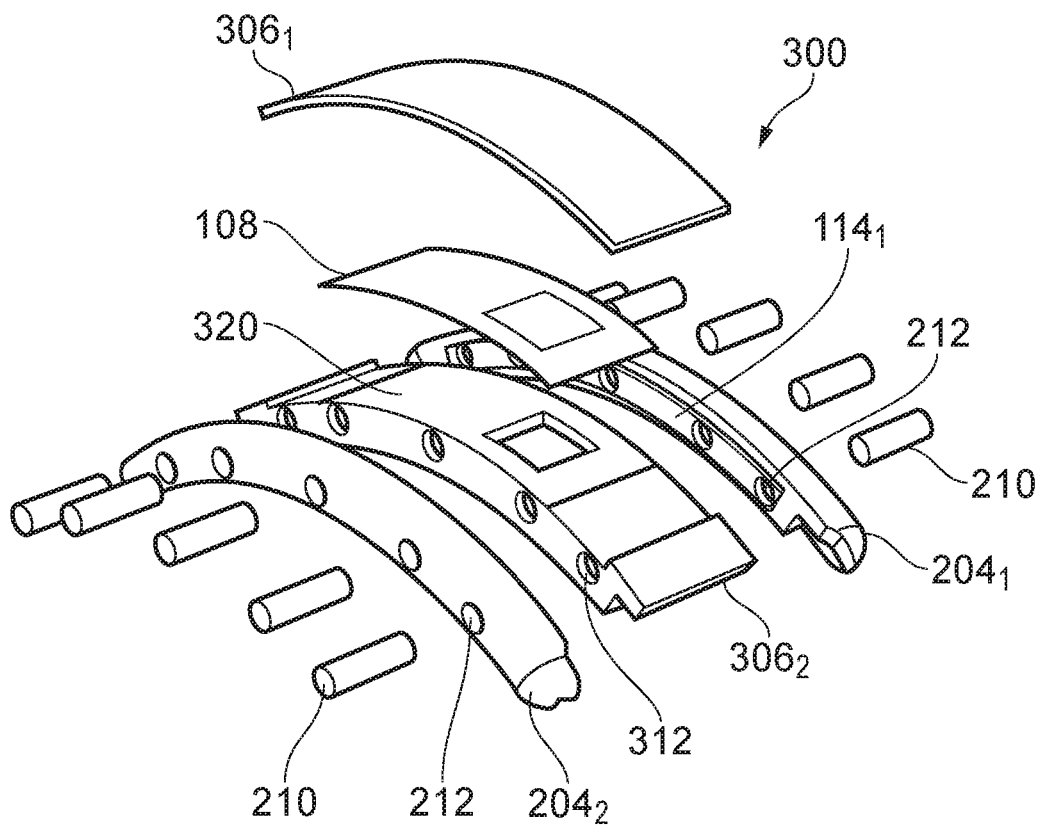
FIGS. 5a and 5b illustrate expanded and side views respectively of another wearable device.
Figure 5B:
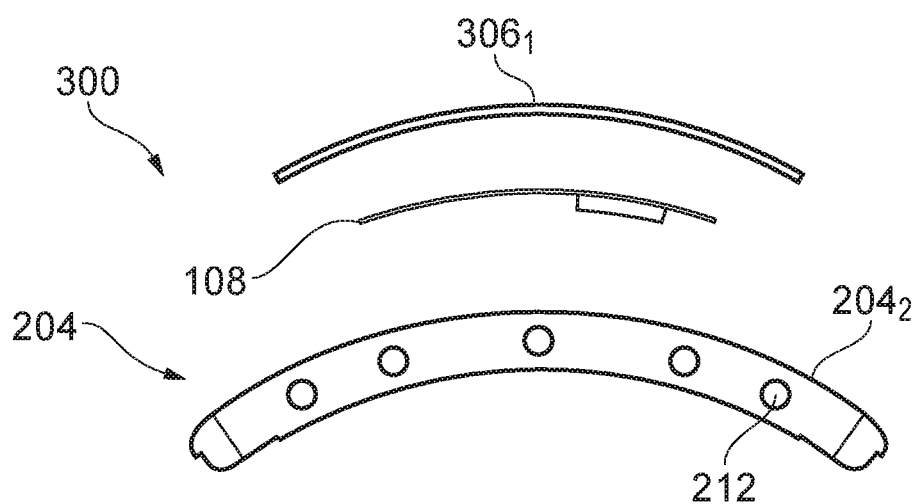

FIGS. 5a and 5b illustrate another wearable device 300. This example has corresponding features to the example of FIGS. 4a and 4b.

However, in this example the body includes a lower body element $306_2$. The lower body element includes apertures 312, which couple with sub-coupling elements 210, to couple the side frame elements $204_{1-2}$ to the body. The sub-coupling elements 210 can screw directly into an inner surface of the apertures 312. Alternatively, the sub-coupling elements may have an interference fit (e.g. a click-fit) with the apertures 312. Additionally, or alternatively, the sub-coupling elements may be connected to the lower body element $306_2$ through the use adhesives.

In this example the banking or payment tag 108 is layered onto the body portion (which includes upper body element $306_1$ and lower body element $306_2$). That is, the lower body element $306_2$ includes an indent 320 to house the banking or payment tag 108, and the banking or payment tag is laid onto the body element in the indent 320. The upper body element $306_1$ can be added as the last element in the manufacturing process. For example, the upper body element may be added as a solid piece of non-metallic material (e.g. in the form of a plastic, resin, enamel, glass or polymeric material). Alternatively, the upper body element may be applied in liquid form and hardened (e.g. by a heat curing process), to enclose the tag and optionally also provide a decorative finish to the wearable device.

Figure 6A:
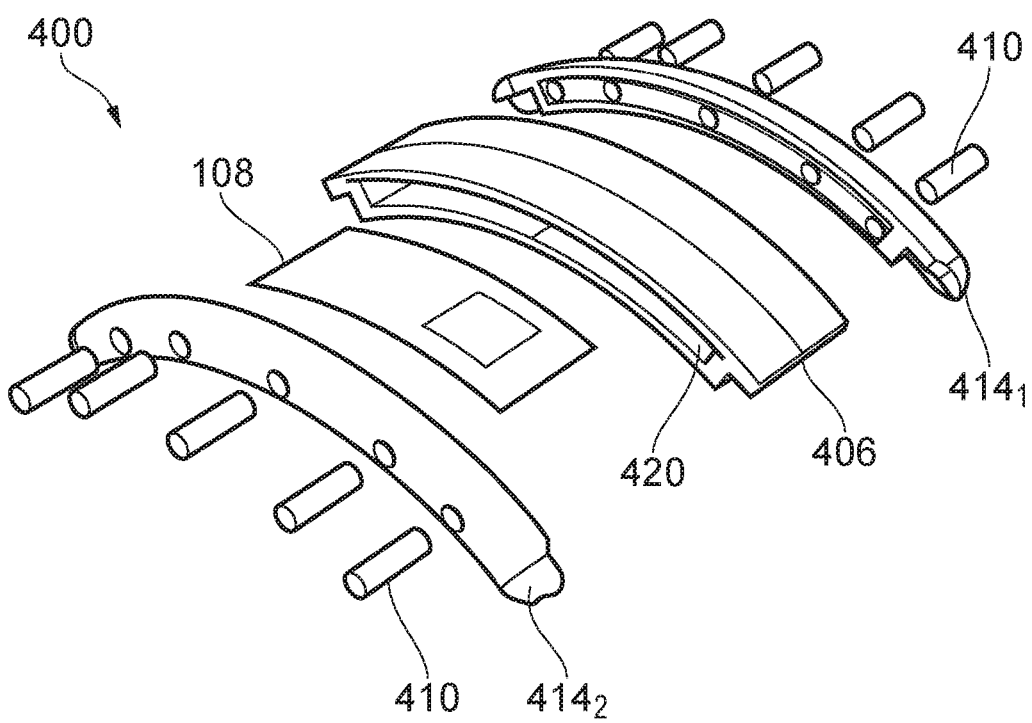
FIGS. 6a and 6b illustrate expanded and side views respectively of another wearable device.
Figure 6B:
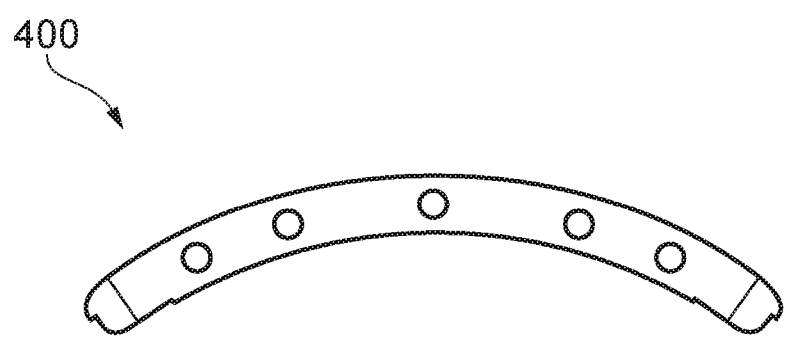

FIGS. 6a and 6b illustrate another wearable device 400, similar to the wearable device 100 in FIG. 2a. However, in this example the banking or payment tag 108 is inserted into an orifice 420 of a single piece body portion 406. Coupling elements 410 can screw directly into the body portion 406 and/or adhesives may be used to connect the side frame elements $414_{1-2}$ to the body portion 406. The coupling elements 410 may alternatively fit into an aperture in the body portion 406 to lock the side frame elements and the body portion together. In this example, adhesives may also be used but may not be required. In an example in which the coupling elements are screws or a threaded bolt, the device may advantageously be disassembled and reassembled to allow the tag to be replaced if desired.

Figure 7A:
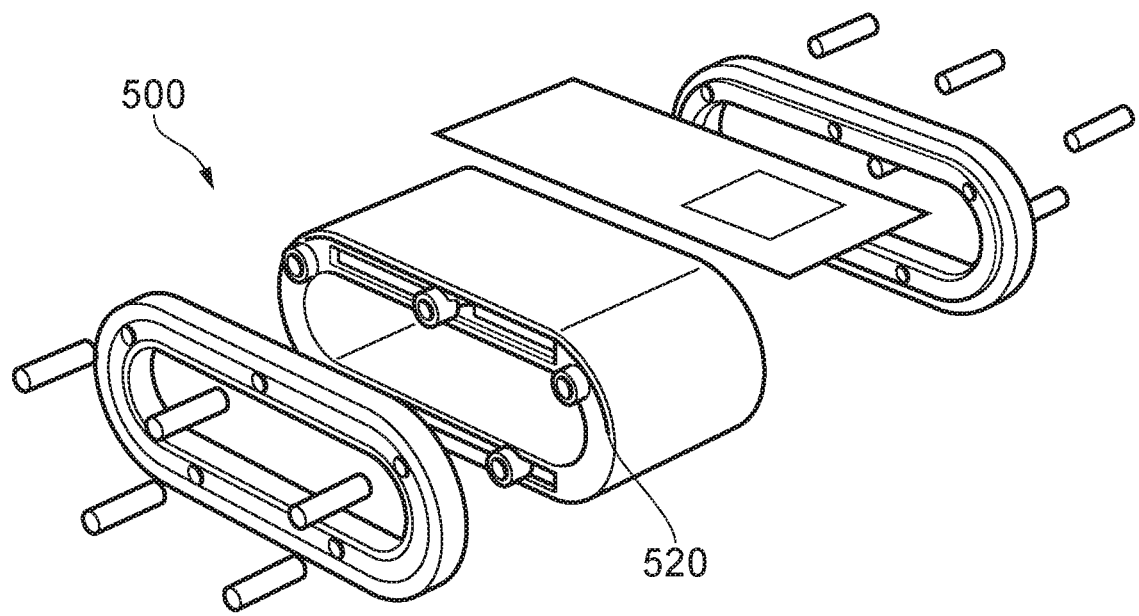
FIGS. 7a and 7b illustrate expanded and side views respectively of another wearable device.
Figure 7B:
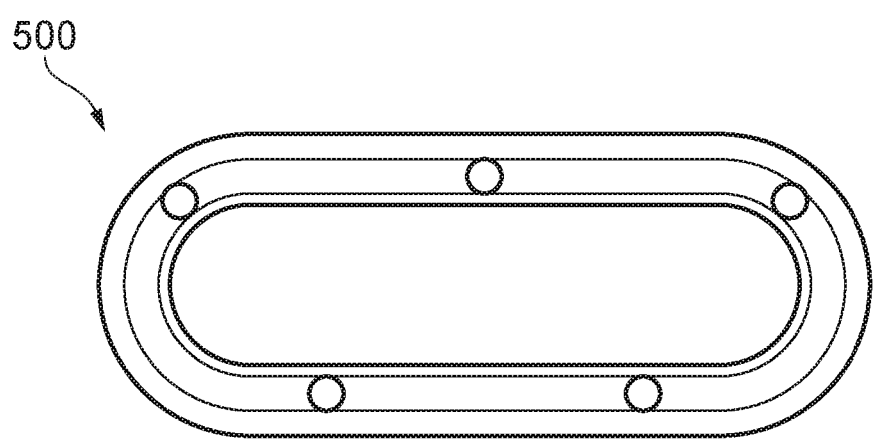

FIGS. 7a and 7b illustrate a wearable device 500 for use as a loop on a watch strap. The device is very similar to the example shown in FIG. 6a, except that the side frame elements and the body portion are each formed as a complete loop. The banking or payment tag similarly fits into an orifice 520 in the body portion. The aperture through the centre of the device may be appropriately sized and shaped to fit over a watch or wrist strap. Alternatively, the size of the aperture may be larger and more circular so that the device may be configured as e.g. a ring or a bangle.

Figure 8A:
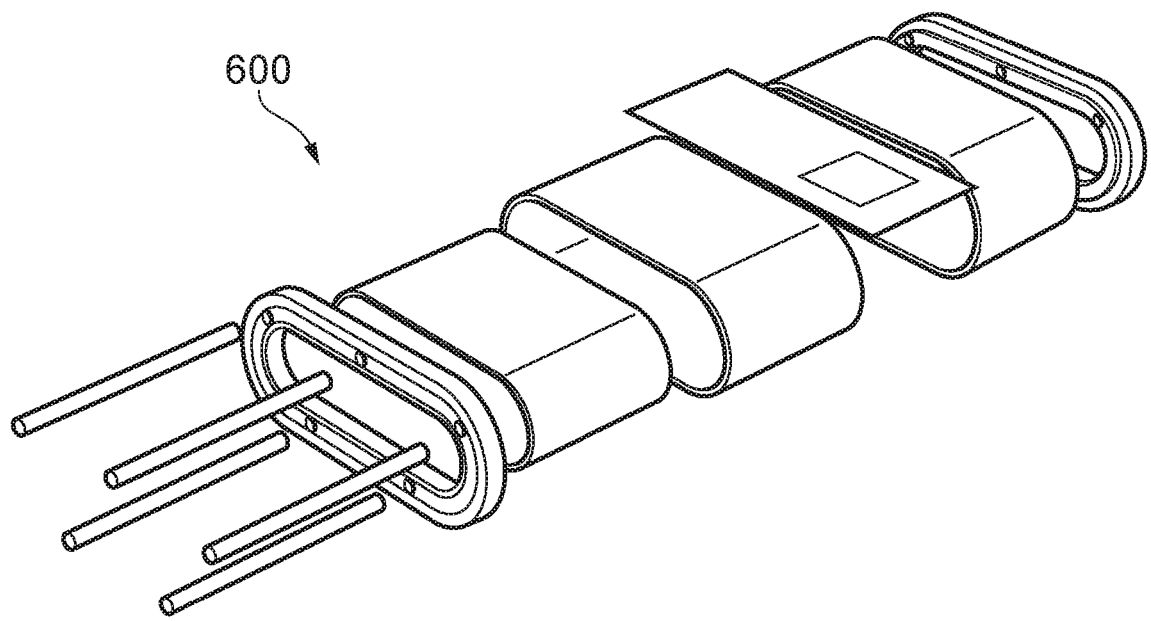
FIGS. 8a and 8b illustrate expanded and side views respectively of another wearable device.
Figure 8B:
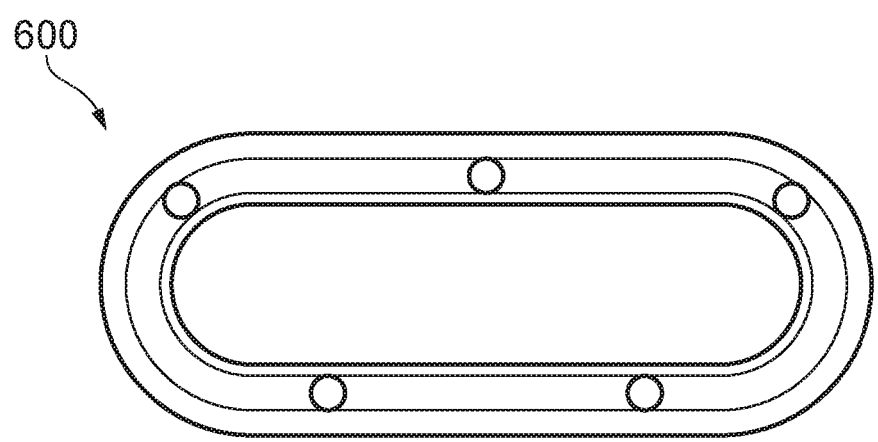

FIGS. 8a and 8b illustrate another wearable device 600. This example has corresponding features to the example of FIGS. 2a and 2b, except that each of the body elements and the side frame elements are formed as a complete loop. Similarly to the example in FIG. 7a, the aperture through the centre of the device may be appropriately sized and shaped to fit over a watch or wrist strap. Alternatively, the size of the aperture may be larger and more circular so that the device may be configured as e.g. a ring or a bangle.

Figure 9A:
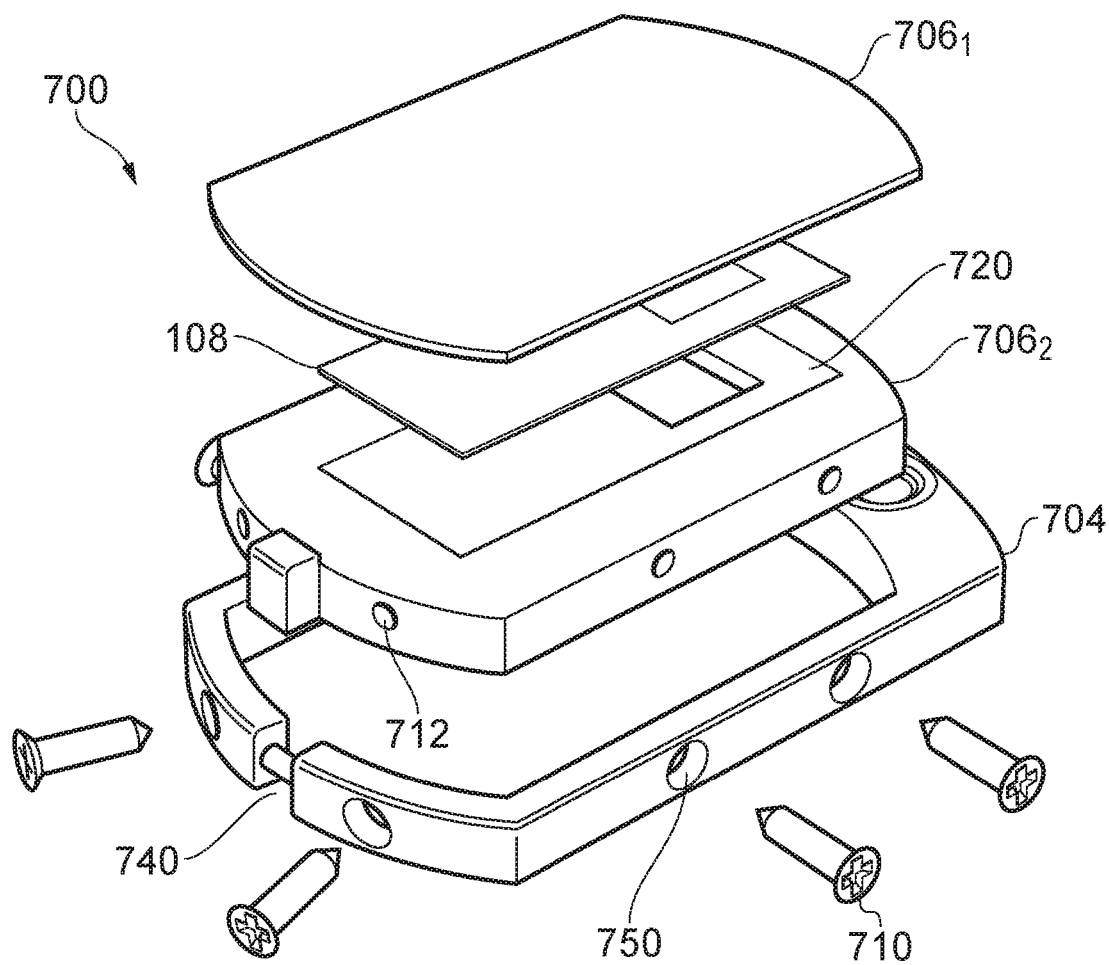
FIGS. 9a and 9b illustrate expanded and side views respectively of another wearable device.
Figure 9B:
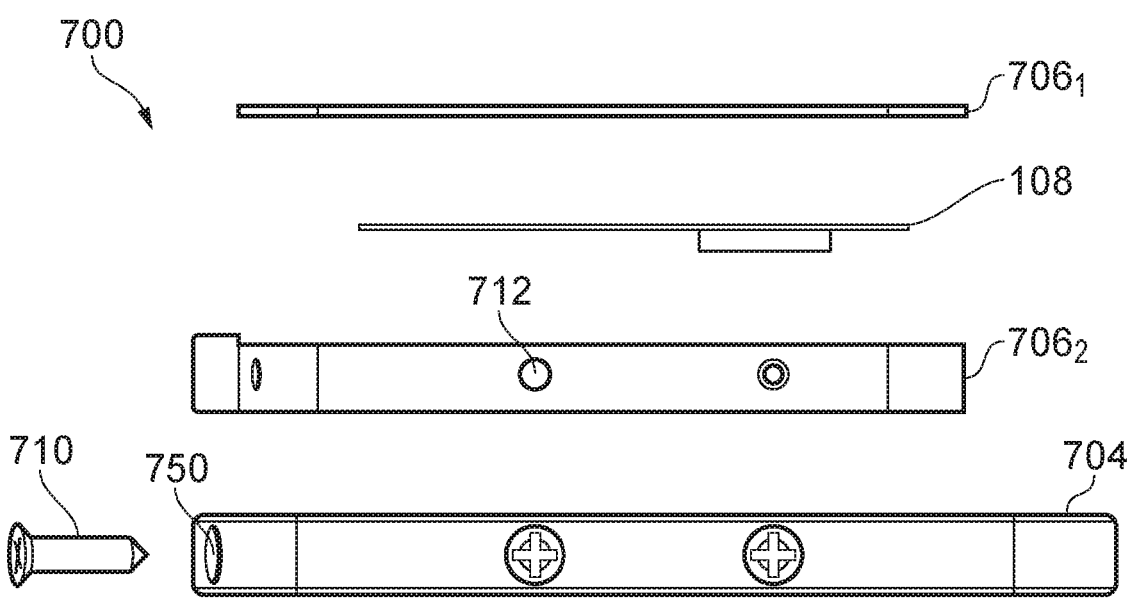

FIGS. 9a and 9b illustrate another wearable device 700 that may be used as a tag, keyring, or pendant, for example. This example includes a frame member 704 including a gap or opening 740. The device further includes a body portion having an upper body element $706_1$ and a lower body element $706_2$. The lower body element $706_2$ includes an indent (recess portion) 720 for housing a banking or payment tag 108.

The lower body element further includes apertures 712 in a side wall thereof. The frame member 704 includes corresponding apertures 750 that align with the apertures 712 in the lower body element when the lower body element is inserted into the frame member 704. Coupling elements 710 may extend through the apertures 712 and 750 to couple the body portion to the frame member. In this example, the coupling elements 710 are screws. The apertures 712, 750 may be internally threaded to engage with corresponding threads of the screws. The upper body element $706_1$ may be fixed with adhesives, or alternatively may be a liquid coating that is hardened (e.g. by heat or light (UV) curing).

Figure 10A:
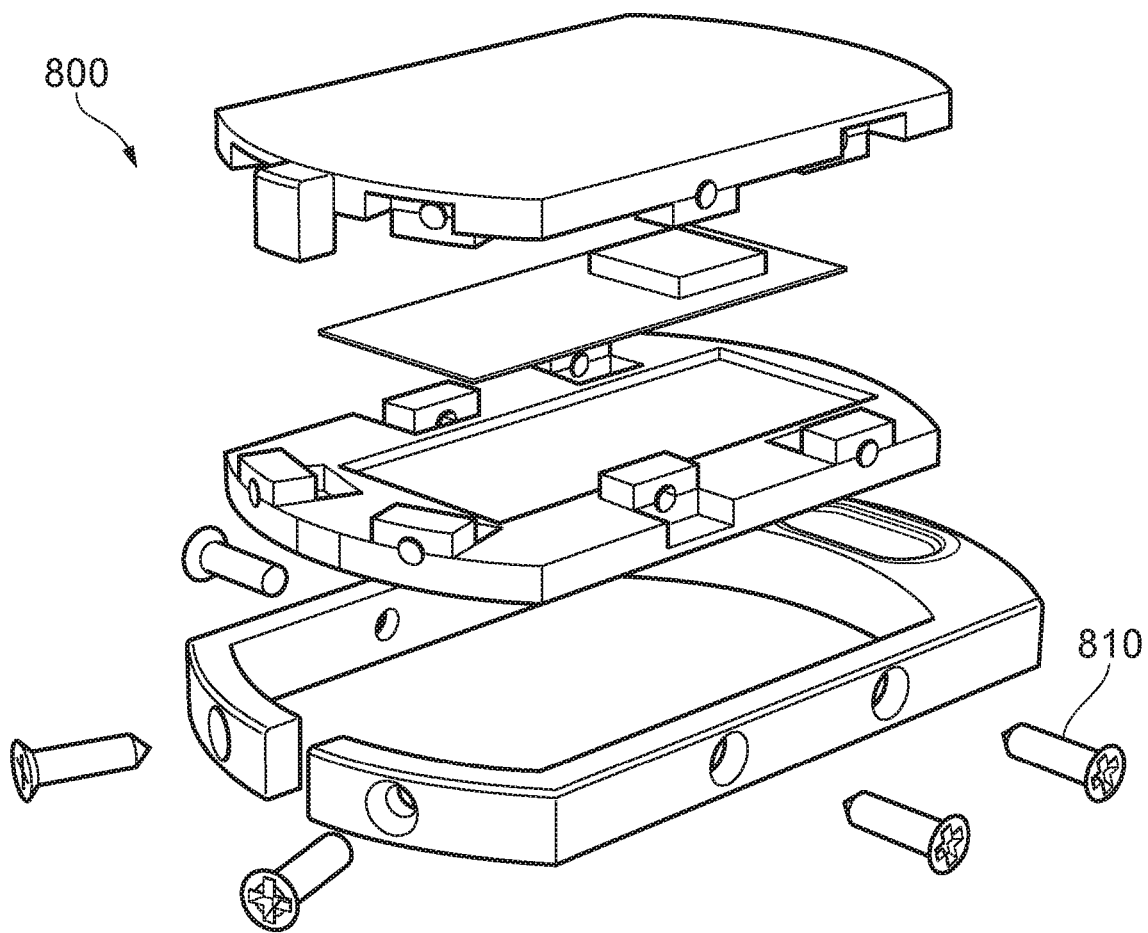
FIGS. 10a and 10b illustrate expanded and side views respectively of another wearable device.
Figure 10B:
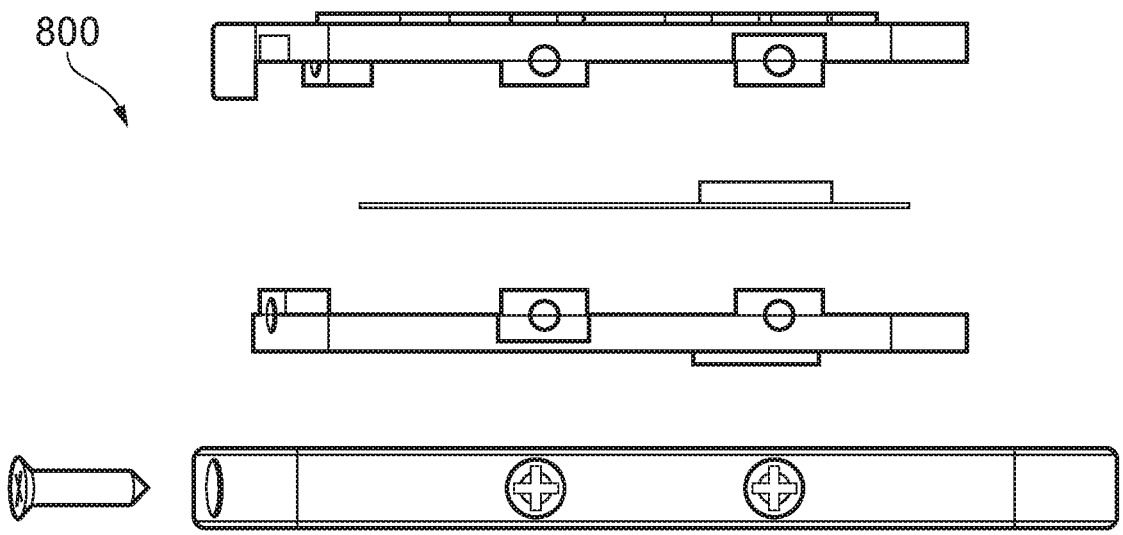
Figure 11A:
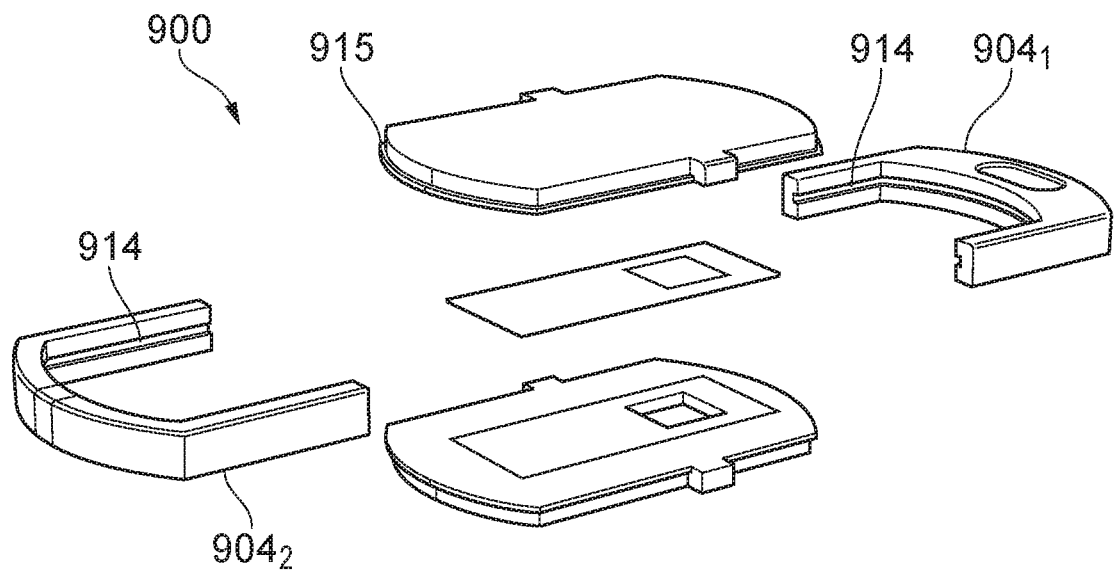
FIGS. 11a to 11d illustrate perspective views of another wearable device.
Figure 11B:
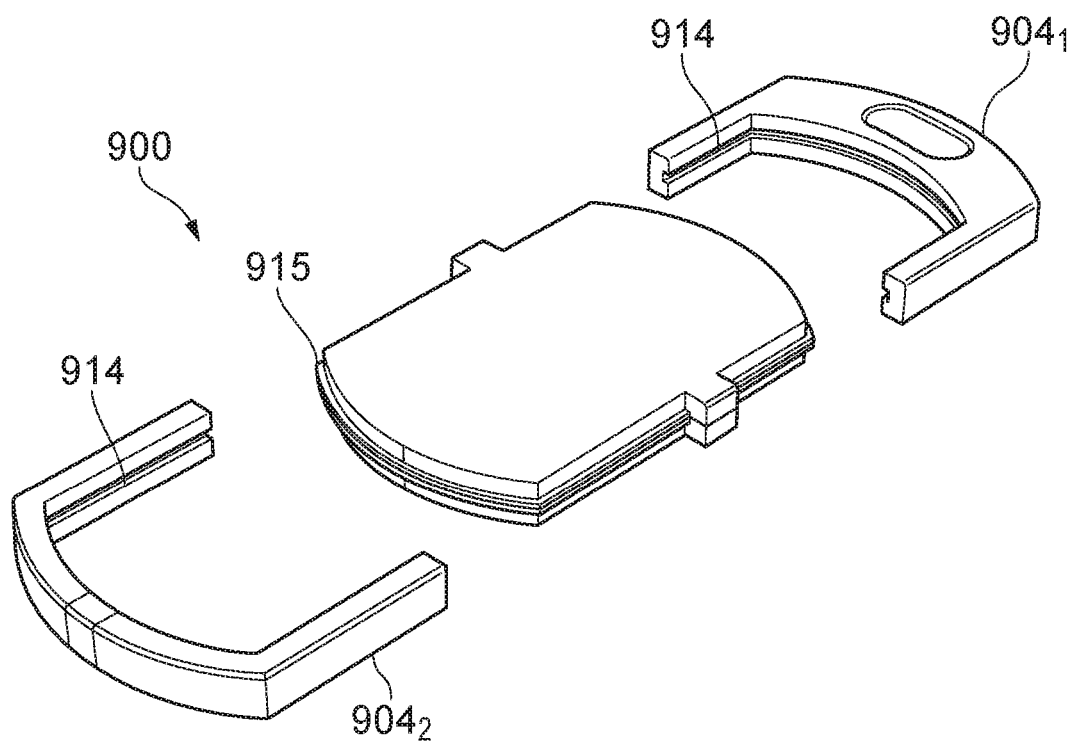
Figure 11C:
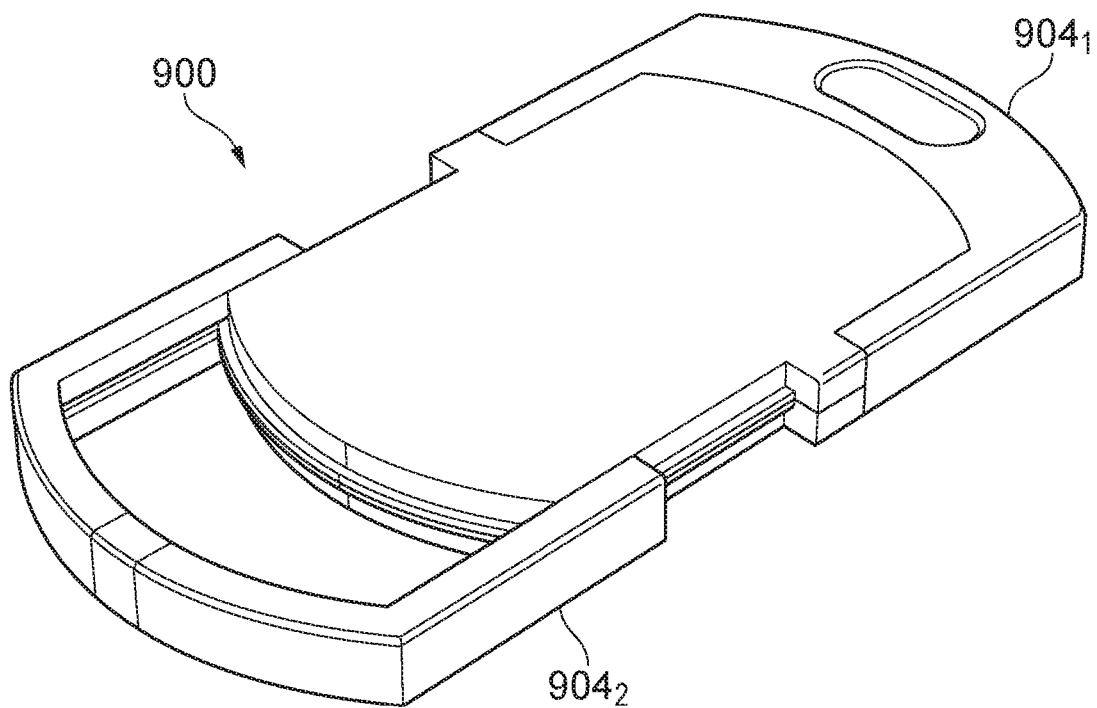
Figure 11D:
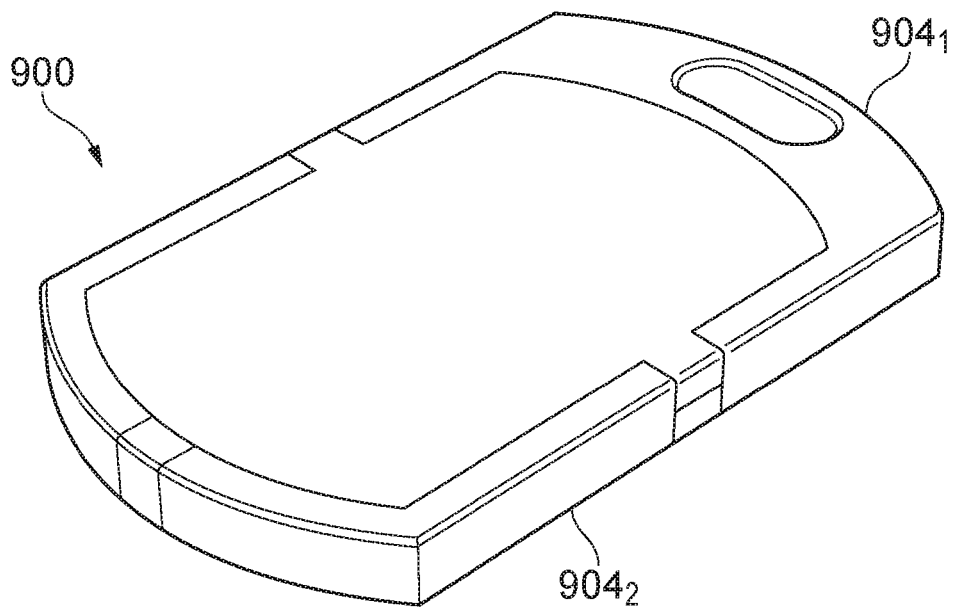

FIGS. 10a and 10b illustrate another example of a wearable device 800. This example is similar to the example shown in FIG. 9, with an alternatively formed body portion. In this example, the upper and/or lower body elements include projections with corresponding recesses on the other body element so that the elements may snap fit together, with the banking or payment tag therebetween. This may allow for the wearable device to be more easily disassembled to allow replacement of the tag before reassembly. Coupling elements 810 may optionally be used to engage either or both the top and bottom elements of the body portion to provide additional strength to the device.

FIGS. 11*a* to 11*d* illustrate a further example of a wearable device 900. The wearable device 900 is configured similarly to the device of FIGS. 9*a* and 9*b*. However, in this example, the frame portion includes first and second frame elements $904_{1\text{-}2}$. The first and second side frame elements include a locating groove 914 on an inner surface for receiving a corresponding flange 915 on the body portion. The first and second side frame elements may therefore slidingly engage with the body portion to couple the body portion and the side frame elements together. Adhesives may optionally be used to secure the side frame elements into position.

Any of the devices described herein may be used as part of a system further including a tag reader configured to read data from the banking or payment tag (or other passive or active tag). For example, when the wearable device is brought into close proximity (i.e. within the operating range of the tag) with the tag reader may read data on the tag and use the date to provide an additional authentication step for a banking or payment transaction. For example, the tag reader may read data on the tag and communicate with an external system to confirm that the tag is associated with an authorised person. If the tag data confirms that the tag is associated with an authorised person, then the transaction may be approved. If the tag is not associated with an authorised person then the banking or payment transaction may be declined.

Various modifications to the detailed arrangements described above are possible.

Although some examples described above include at least one passive banking or payment tag, the banking or payment tag in any of the examples described herein may alternatively be any other passive or active tag, as may be suitable for the intended purpose. It will be appreciated that examples of the devices including an active tag will further include a power source (for example a battery), which may also be included in the wearable device, e.g. supported on the body portion similarly to the tag. The power source may be rechargeable (e.g. by connection to mains power source, or wirelessly). In other examples, the power source may be replaceable.

More than one passive or active tag (e.g. more than one banking or payment tag) may be provided. Devices with more than one tag (i.e. a plurality of tags), such as two or more tags, or three or more tags, may be provided with different data on each of the tags allowing each of the tags to have different functions. In some examples, two or more of the plurality of tags may have the same function to improve readability of the device (i.e. if one tag cannot be read e.g. because it is not in the operable position with respect to the reader, there is a chance another tag having the same function may be read instead).

In some examples, each tag may perform multiple tasks or functions. For example, tasks or functions may include any combination of authentication, making payments or other financial processes, or other tasks associated with a typical RFID or NFC tag as discussed above.

The locating groove may comprise flanges on a top and bottom edge of the frame or on side edges of the frame. The flanges thereby hold the body into place, the body being configured to sit between the two flanges and inside the frame.

The frame may be provided with any suitable apertures in at least one wall of the frame, for example instead of apertures there may be slots or recesses. The apertures, slots or recesses may be internally threaded so as to receive screws that pass through the wall of the frame and optionally into the body to securely hold the body in the frame.

In some examples, the coupling element may include a suitable adhesive. In some examples, an adhesive may be used in combination with coupling rods or screws.

The body portion may contain conductive materials, for example carbon fibre.

The passive or active tag (e.g. banking or payment tag) may be supported on the body in a number of ways. The tag may be inserted into an orifice in the body. Alternatively, the tag is layered onto the body. The tag may then be coated with a resin, glass, polymeric material or ceramic material. Alternatively, the tag is sandwiched between two or more parts or the body.

Other passive chips or tags may also be used in place of an NFC chip. For example, longer range RFID chips and tags may be used.

Any of the examples above may be modified by adding a decorative layer onto the top or bottom surfaces or another part of the body portion once the device has been assembled. For example, a solid piece of non-metallic material (e.g. carbon fibre sheet, or a plastic, resin, enamel, glass or polymeric material) may be added to a surface of the body to provide a decorative function. Additionally or alternatively a coating may be added in a liquid form that may be solidified (e.g. by heat curing) to give a decorative finish as well as helping seal in the tag for protection.

Any of the examples above may be modified to be sized and shaped to form an item of jewellery or a part of an item of jewellery. For example, an item of jewellery may include any of a ring, a pendant, a bracelet, a bangle, a brooch, a watch, an earring, cuff links etc.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A wearable device comprising:
   a frame portion; and
   a body portion;
   wherein the frame portion is formed from a metallic material and the body portion is formed from a non-metallic material and supports at least one passive or active proximity tag, the frame portion comprising a plurality of frame elements which are assembled around the body portion to form the frame portion and to retain the body portion and the at least one passive or active proximity tag between the assembled frame elements in a fixed position with respect to the frame portion, and wherein the body portion and the at least one passive or active proximity tag are partially surrounded by the assembled frame, the assembled frame comprising an opening through which the at least one active or passive proximity tag is operable, the opening formed by a spacing between two or more of the frame elements, the spacing sufficient to enable operability of the passive or active proximity tag therethrough and the body portion and the frame portion being configured to be disassembled from around the body portion to allow removal of the body portion and the at least one active or passive tag, wherein the opening is from about 0.1 mm to about 30 mm;
   wherein the frame portion further comprises one or more locating groove configured to couple with the body portion to support the body portion in the frame portion; and/or
   the wearable device further comprises coupling elements for coupling together the plurality of frame elements and wherein the coupling elements comprise screws, pins, rods, hinges, rivets and/or adhesives.

2. The wearable device according to claim 1, wherein the wearable device is for use in banking or payment technology and wherein the at least one passive or active tag is a banking or payment tag.

3. The wearable device according to claim 1, wherein the one or more locating groove comprises a recess in an inner surface of the frame portion into which the body portion is configured to sit.

4. The wearable device according to claim 1, wherein each of the frame elements comprise apertures configured to receive at least a portion of the coupling elements.

5. The wearable device according to claim 1, wherein the frame portion comprises first and second spaced apart side frame elements.

6. The wearable device according to claim 1, wherein the body portion comprises two or more parts and the at least one passive or active tag is sandwiched between the two or more parts of the body portion.

7. The wearable device according to claim 1, wherein the body portion comprises an orifice, and the at least one passive or active tag is supported within the orifice.

8. The wearable device according to claim 1, comprising at least two passive or active tags, wherein each of the at least two passive or active tags are programmed with the same or different information.

9. The wearable device according to claim 1, wherein the at least one passive or active tag is programmed to perform multiple functions.

10. A system comprising the wearable device according to claim 1, further comprising:
    a tag reader configured to read data from the at least one passive or active tag when the tag reader and the wearable device come into close proximity with each other, to thereby provide an additional authentication step.

11. The system according to claim 10, wherein the tag reader is a banking or payment tag reader and the passive or active tag is a banking or payment tag, and wherein the additional authentication step is for a banking or payment transaction.

12. A method for providing additional authentication, the method including:
    i) providing the wearable device according to claim 1;
    ii) reading data from the passive or active tag with a tag reader; and
    iii) using the data to provide an additional authentication step.

13. The method according to claim 12, wherein the tag reader is a banking or payment tag reader and the passive or active tag is a banking or payment tag, and wherein the additional authentication step is for a banking or payment transaction.

14. The wearable device according to claim 1, wherein the opening is from about 1 mm to about 5 mm.

15. The wearable device of claim 1, wherein the wearable device is configured as at least a portion of a jewellery item.

* * * * *